US011650302B2

(12) United States Patent
Sautermeister et al.

(10) Patent No.: US 11,650,302 B2
(45) Date of Patent: May 16, 2023

(54) METHOD FOR DETECTING POTENTIAL FAULTY STATES ON AN FMCW-BASED FILLING LEVEL MEASURING APPARATUS

(71) Applicant: Endress+Hauser SE+Co. KG, Maulburg (DE)

(72) Inventors: Manuel Sautermeister, Schopfheim (DE); Lukas Schwörer, Schopfheim (DE); Winfried Mayer, Buch (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 196 days.

(21) Appl. No.: 16/966,737

(22) PCT Filed: Jan. 14, 2019

(86) PCT No.: PCT/EP2019/050806
§ 371 (c)(1),
(2) Date: Jul. 31, 2020

(87) PCT Pub. No.: WO2019/149513
PCT Pub. Date: Aug. 8, 2019

(65) Prior Publication Data
US 2020/0363521 A1    Nov. 19, 2020

(30) Foreign Application Priority Data
Feb. 2, 2018   (DE) .................... 10 2018 102 367.7

(51) Int. Cl.
*G01S 13/34*    (2006.01)
*G01F 23/284*   (2006.01)
(Continued)

(52) U.S. Cl.
CPC .......... *G01S 13/343* (2013.01); *G01F 23/284* (2013.01); *G01F 25/20* (2022.01);
(Continued)

(58) Field of Classification Search
CPC .... G01S 12/343; G01S 7/4004; G01S 7/4091; G01S 7/4052; G01S 7/038; G01S 7/354;
(Continued)

(56) References Cited

U.S. PATENT DOCUMENTS 9,128,181 B2    9/2015  Wegemann
2003/0136173 A1  7/2003  Elenich et al.
(Continued)

FOREIGN PATENT DOCUMENTS

CN    101320841 A    12/2008
CN    102538899 A     7/2012
(Continued)

*Primary Examiner* — David Z Huang
(74) *Attorney, Agent, or Firm* — Mark A. Logan; Endress+Hauser (USA) Holding, Inc.

(57) ABSTRACT

Disclosed is a method for detecting a faulty state of an FMCW-based fill level measuring device. For this, a correlation coefficient is ascertained by correlation, especially cross correlation, of the measurement signal with a reference signal. The faulty state is accordingly detected when the correlation coefficient subceeds a predefined minimum value. In this way, the functioning of the fill level measuring device can be monitored with a degree of safety allowing the fill level measuring device to be applied also in process plants and measuring environments, which require extremely reliable measuring apparatuses, and measurement data.

10 Claims, 3 Drawing Sheets

(51) Int. Cl.
*G01S 7/40* (2006.01)
*G01F 25/20* (2022.01)

(52) U.S. Cl.
CPC .......... *G01S 7/4004* (2013.01); *G01S 7/4056* (2013.01); *G01S 7/4091* (2021.05)

(58) Field of Classification Search
CPC ...... G01S 7/4021; G01S 13/88; G01S 13/343; G01S 7/4056; G01F 23/284; G01F 25/20
See application file for complete search history.

(56) References Cited

U.S. PATENT DOCUMENTS

| | | |
|---|---|---|
| 2008/0143583 A1 | 6/2008 | Welle et al. |
| 2017/0211963 A1 | 7/2017 | Taheri et al. |
| 2018/0149474 A1* | 5/2018 | Tixier .................... G01F 22/00 |
| 2019/0360853 A1 | 11/2019 | Sautermeister et al. |

FOREIGN PATENT DOCUMENTS

| | | | |
|---|---|---|---|
| CN | 103292865 A | 9/2013 | |
| CN | 103502782 A | 1/2014 | |
| CN | 204115815 U | 1/2015 | |
| DE | 10142538 A1 | 2/2004 | |
| DE | 102017100269 A1 | 7/2018 | |
| EP | 0816865 A2 | 1/1998 | |
| RU | 2650611 C1 * | 4/2018 | |
| RU | 2678933 C2 * | 2/2019 | ........... G01F 23/284 |
| WO | WO-2006076997 A1 * | 7/2006 | ........... G01F 23/284 |
| WO | 2012139852 A1 | 10/2012 | |

* cited by examiner

METHOD FOR DETECTING POTENTIAL FAULTY STATES ON AN FMCW-BASED FILLING LEVEL MEASURING APPARATUS

CROSS-REFERENCE TO RELATED APPLICATIONS

The present application is related to and claims the priority benefit of German Patent Application No. 10 2018 102 367.7, filed on Feb. 2, 2018 and International Patent Application No. PCT/EP2019/050806, filed on Jan. 14, 2019, the entire contents of which are incorporated herein by reference.

TECHNICAL FIELD

The invention relates to a method for detecting a possible faulty state of an FMCW-based fill level measuring device, as well as to a fill level measuring device suitable for performing such method.

BACKGROUND

In automation technology, especially in process automation technology, field devices are often applied, which serve for registering and/or for influencing process variables. For registering process variables, sensors are applied, which are used, for example, in fill level measuring devices, flowmeters, pressure- and temperature measuring devices, pH-redox potential measuring devices, conductivity measuring devices, etc. These register the corresponding process variables, such as fill level, flow, pressure, temperature, pH value, redox potential and conductivity. A large number of these field devices are produced and sold by the firm, Endress+Hauser.

For fill level measurement of fill substances in containers, contactless measuring methods have proven themselves, since they are robust and require low-maintenance (considered as "containers" within the scope of the invention are also open containers, such as, for example, vats, lakes or oceans or flowing bodies of water). A further advantage of contactless measuring methods is their ability to measure the fill level virtually continuously, thus, with a very high resolution. Accordingly, primarily radar-based measuring methods are applied for this. An established measuring principle, in such case, is the FMCW measuring principle (wherein FMCW stands for "Frequency Modulated Continuous Wave"). In such case, a continuous radar signal is transmitted and the response signal, which is reflected on the surface of the fill substance, is compared with the frequency of the instantaneously transmitted radar signal. In such case, the frequency of the radar signal lies in a fixed frequency band in the region of a standardized center frequency ($f_0$). According to standard, here frequency bands in the 6 GHz band, the 26 GHz band, or the 79 GHz band are used. Characteristic for the FMCW method is that the transmitted frequency is not constant, but, instead, changes periodically within a frequency band. The change can, in such case, be linear and have a sawtooth- or triangular shape. A sinusoidally shaped change can, however, also be used, depending on application.

In the case of the FMCW-based fill level measurement method, a special challenge is to be able to distinguish the received response signal, or the measurement signal derived therefrom, from superimposed disturbance fractions, without there being any doubt as to the correctness of the identification. In such case, the response signal in the ideal case should be produced exclusively by reflection of the radar signal on the fill substance surface. Due to disturbing influences of corresponding error sources, however, defective response signals can be generated. An essential cause, in such case, is the receipt of disturbance signals, which are brought about by reflection of the radar signal on disturbing bodies, such as stirrers or other objects installed in the container. However, also apparatus internal disturbance signals can occur, in which case the error source is, for example, a feedback in the antenna unit of the fill level measuring device.

Many different technical approaches exist for filtering disturbance signals in the case of FMCW-based fill level measurement, in order to be able to correct the response signal. Thus, known from WO 2012/139852 A1 is a method for calibration of FMCW-based fill level measuring devices, in the case of which during normal measurement operation a unique reference measurement signal can be generated by means of an oscillating reference reflector, which is positioned between measuring device and fill substance.

Described in German patent application DE 10 2008 050 117 A1 is a method for correction of internal disturbance signals of the fill level measuring device. The method described there is based on measuring a reference measurement signal in a test environment, which is as absorbing as possible, and subsequent creating of a correction curve based on the reference signal. By means of this method, disturbance signals can, indeed, in given cases, be compensated, but an aging or fouling of the fill level measuring device also changes the disturbance signals, or the measurement signals, overtime. Therefore, it is of interest to perform the correction in ongoing operation and to conclude that a faulty state exists, when a change of the compensation values is observed. The detection of such a faulty state is desirable exactly in the case of fill level measuring devices, which are applied in critical process plants with high required reliability. The needed requirements for such a use are described, for example, in the standard, IEC/EN 61508, for functional safety (also known as "safety integrity level, SIL").

SUMMARY

An object of the invention, therefore, is to provide a method, with which a faulty state of FMCW-based fill level measuring devices can be reliably detected.

The invention achieves this object by a method for detecting a faulty state of an FMCW-based fill level measuring device serving for measuring a fill level of a fill substance located in a container, comprising method steps as follows:
  transmitting a radar signal,
  receiving a response signal,
  creating a measurement signal based at least on the response signal,
  ascertaining a correlation coefficient by means of correlation of the measurement signal with a reference signal, and
  detecting the faulty state when the correlation coefficient subceeds a predefined minimum value.

In such case, a faulty state is defined within the scope of the invention as a state of the fill level measuring device, in the case of which it cannot be assured that the fill level measuring device ascertains a correct fill level.

Thus, the method of the invention can determine with a high degree of certainty a possible faulty state of a fill level measuring device. In this way, the fill level measuring device can be used also in process plants and measuring environments, which require extremely reliable measuring apparatuses, and measurement data.

Advantageously for calculating the correlation coefficient, the correlation coefficient is calculated by means of a cross correlation, especially with the usual formula for cross correlation:

$$K = \sum_{i=1}^{n-\varphi} A_{ZF,i} * A_{ref,i+\varphi}$$

Applied as reference signal in the context of the invention is, in principle, any measurement signal, which represents a defined reference situation of the fill level measurement, either in the container or in another reference environment. Accordingly, various options are available for implementing the reference signal. On the one hand, the reference signal can be based on a theoretically derived, ideal echo curve. As basis for this, for example, an ideally reflecting plane with known distance and infinite extent can be used. Alternatively, the reference signal can be based on a reference measurement, which is performed by the fill level measuring device in the container in the presence of previously known, reference measurement conditions. A reference measurement condition in the container can be, for example, a prevailing, or subceeded, minimum fill level. In such case, the presence of a clean container interior can represent an additional reference measurement condition.

Another possible reference measurement condition for creating a reference signal, in the case of which exclusively internal sources of failure of the fill level measuring device are mapped, is composed in the recording of the reference signal in a test environment, such as, for example, an absorption chamber, in which the radar signal is completely absorbed and, thus, no response signal is produced.

Moreover, the method of the invention can be further developed in a form such that, based on the correlation coefficient and its change during ongoing fill level measurements, a time-dependent function of correlation coefficient is created. Accordingly, for the case, in which the correlation coefficient has not yet subceeded the predefined minimum value, a remaining operating time, until the minimum value is subceeded, can be calculated based on the time-dependent function of correlation coefficient. Thus, this further development uses the idea of approximating a remaining operating time by ascertaining the time development of the correlation coefficient over at least two or more fill level measurements, in order to estimate when the minimum value will probably be subceeded and, thus, the faulty state of the fill level measuring device entered. Proviso for this is that the correlation coefficient at the current point in time has not yet subceeded the minimum value.

By means of this further development of the invention, thus, a faulty state can be predicted based on the principle of "predictive maintenance". In such case, the time-dependent function of correlation coefficient can be created by means of regression, in the simplest case a linear regression. In general, the choice of a suitable regression type (thus, exponential, logarithmic, polynomial, sliding average value formation, etc.) in the sense of invention is not limited to any particular regression type, but, rather, depends on the individual time behavior of the correlation coefficient. For performing the regression and/or for ascertaining a suitable regression type, accordingly, for example, the method of least squares can be applied.

An object of the invention is achieved analogously to the method of the invention by a fill level measuring device for performing the method of at least one of the above described variants. For this, such a fill level measuring device comprises:
  a signal production circuit for producing a radar-based signal,
  a transmitting antenna for transmitting the radar-signal,
  a receiving antenna for receiving the response signal,
  a mixer for producing the measurement signal by means of mixing the radar signal ($S_{HF}$) with the response signal, and
  an evaluating unit for
    ascertaining fill level based on the measurement signal,
    ascertaining the correlation coefficient based on the measurement signal and the reference signal, and for
    detecting the faulty state when the correlation coefficient subceeds a predefined minimum value.

In such case, the evaluating unit is advantageously so designed that, for ascertaining fill level, it performs a Fourier transformation, especially a fast Fourier transformation, of the measurement signal, since in comparison to other types of calculation this require less effort.

BRIEF DESCRIPTION OF THE DRAWINGS

The invention will now be explained in greater detail based on the appended drawing, the figures of which show as follows.

DETAILED DESCRIPTION

Figure 1:
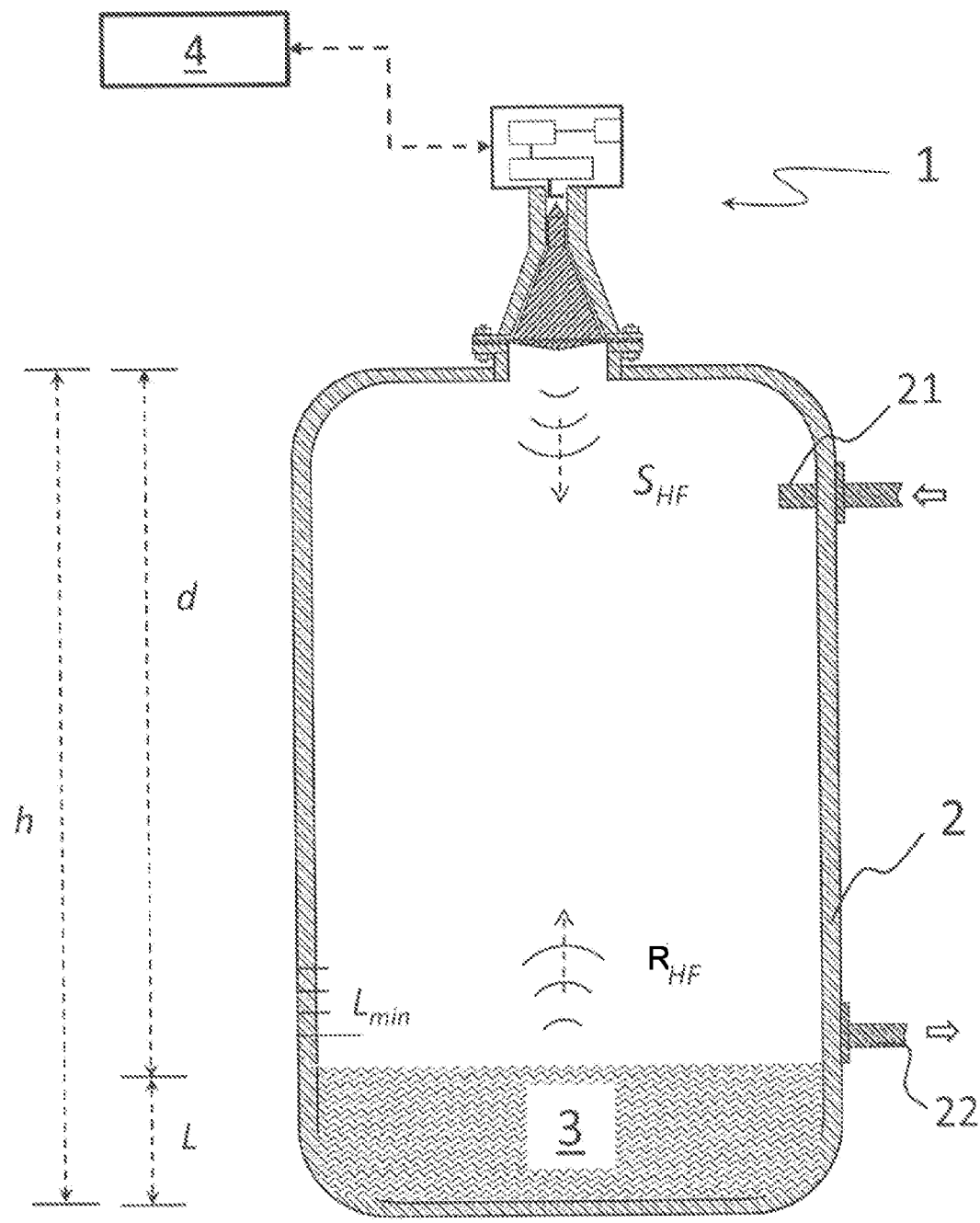
FIG. 1 shows a typical arrangement of an FMCW based fill level measuring device on a container.

First, for understanding the method of the invention, FIG. 1 shows a typical arrangement of a fill level measuring device 1 mounted on a container 2 and working according to the FMCW measuring principle. Located in the container 2 is a fill substance 3, whose fill level L is to be determined by the fill level measuring device 1. For this, the fill level measuring device 1 is mounted on the container 2 above the fill substance 3 at a previously known, installed height h measured from the floor of the container 2. The container 2 can, in such case, depending on application, be more than 100 m high.

The fill level measuring device 1 is so arranged on the container 2 that it transmits, sends, a radar signal $S_{HF}$ typical for FMCW in the direction of the surface of the fill substance 3. After reflection of the radar signal $S_{HF}$ on the fill substance surface (or, undesirably, on a disturbing body, such as, for example, an intake 21 protruding into the container), the fill level measuring device 1 receives a corresponding response signal $R_{HF}$. In such case, as characteristic for FMCW, the frequency difference between the instantaneously transmitted radar signal $S_{HF}$ and the response signal $R_{HF}$ depends on the distance d=h−L to the fill substance surface. Thus, from the measured frequency difference, the fill level L can be determined.

As a rule, the fill level measuring device 1 is connected via a bus system, for instance, a "PROFIBUS", "HART" or "wireless HART" bus system, to a superordinated unit 4, for example, a process control system. In this way, on the one hand, information concerning a possible faulty state of the fill level measuring device 1 can be communicated. Also information concerning the fill level L can be transmitted, in order, in given cases, to control flows 21 incoming to the container 2 and/or flows 22 outgoing from the container 2.

Figure 2:
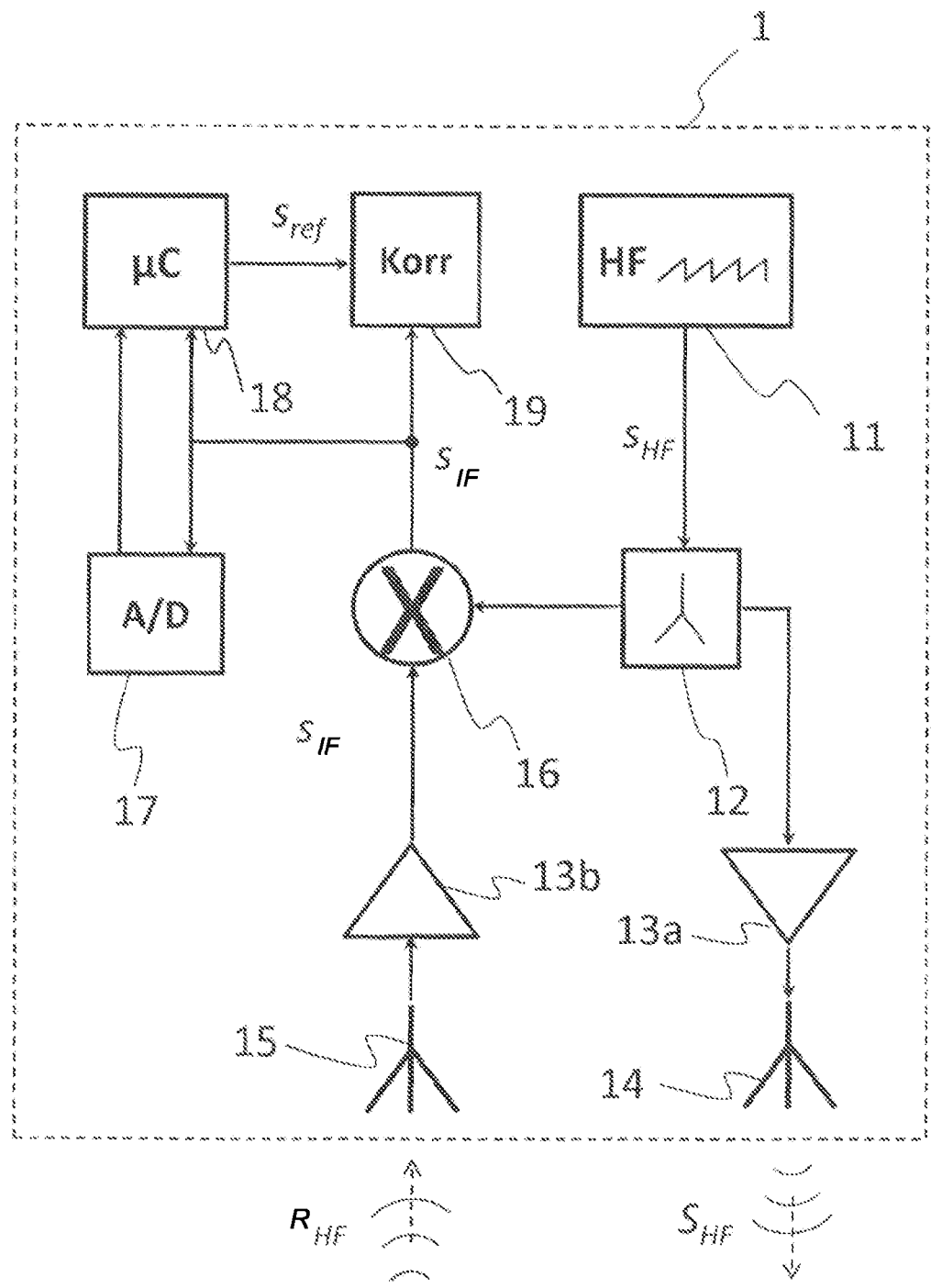
FIG. 2 shows a typical circuit construction of an FMCW based fill level measuring device for performing the method of the invention.

FIG. 2 shows a suitable circuit construction for an FMCW based fill level measuring device 1, with which the method of the invention for detecting a possible faulty state can be practiced. For producing a high frequency signal $s_{HF}$ suitable for the FMCW measuring method, the fill level measuring device includes 1 a signal production circuit 11, for example, based on a PLL ("phase lockedloop" thus, a high frequency oscillator whose frequency is controlled by feedback, for example, based on a voltage controlled oscillator). In such case, the high frequency signal $s_{HF}$ is so sized that it has a frequency in the microwave region (according to standard, at 6 GHz, 26 GHz or 79 GHz, or even a frequency to above 100 GHz). The frequency is, in such case, not constant, but, instead, varies periodically within a predetermined frequency difference: In the case of 79 GHz, the frequency difference can, for example, amount to 2 GHz, so that a frequency band between 78 GHz and 80 GHz is passed through. Usual in the case of the FMCW method is that the periodic change is a sawtooth shaped change of the frequency of the high frequency signal $s_{HF}$. Any other shape, for example, a sinusoidal change of the frequency, can be used within the frequency difference.

The repetition of the (sawtooth shaped) change can, in such case, such as typically in the case of the FMCW method, lie in an order of magnitude extending to some number of 100 MHz. The frequency difference of the high frequency signal $s_{HF}$ is, in this case, preferably sized as large as possible, since by increasing the bandwidth the resolution of the fill level measurement can be increased. Thus, generally, a higher frequency of the high frequency signal $s_{HF}$ is advantageous for resolution, because at higher frequencies a greater frequency difference can be implemented.

After its production, the high frequency signal $s_{HF}$ is fed via a signal divider 12 (and, in given cases, a transmission amplifier 13a) to a transmitting antenna 14. There the electrical high frequency signal $s_{HF}$ is converted into the actual radar signal $S_{HF}$ and correspondingly radiated. The design of the transmitting antenna depends, in such case, on the frequency of the radar signal $S_{HF}$. In the case of frequencies between 6 GHz and 26 GHz, a horn antenna is often applied. Especially in the case of higher frequencies starting from 79 GHz, the antenna is, as a rule, a planar antenna, for example, a fractal, patch or meander shaped antenna, situated on the chip, on which at least the HF components (11, 12, 13a/b, 14, 15, 16) of the fill level measuring device 1 are located.

In measurement operation, a response signal $R_{HF}$ is produced by reflection of the radar signal $S_{HF}$ on the surface of the fill substance 3 (and/or on a disturbing body in the container 2, such as, for example, an intake 21 protruding into the container 2; see FIG. 1). In the case of a calibration or reference measurement with the fill level measuring device 1, the response signal $R_{HF}$ results from reflection of the radar signal $S_{HF}$ under predefined, reference conditions, for example, by a reference object arranged in a measurement path at known distance d. Another reference condition can be defined by an exactly known fill level L in the container 2 (for example, by a known minimum fill level $L_{min}$, which, for example, due to a correspondingly arranged drain 22, cannot go lower, see, again, FIG. 1). Moreover, a reference condition can also be a reflection free as possible measuring environment (for example, an absorption chamber, into which the fill level measuring device points). In such case, optimally, there is no response signal $R_{HF}$ at all. The response signal $R_{HF}$ obtained under reference conditions is then stored as reference signal $s_{ref}$. Alternatively to the creating of the reference signal $s_{ref}$ by measuring under reference conditions, the reference signal $s_{ref}$ can also be based on a theoretically derived, ideal echo curve.

At a receiving antenna 15 of the fill level measuring device 1, the response signal $R_{HF}$ is received and converted into an electrical signal (which, in turn, can, in given cases, be amplified by a receiving amplifier 13b). Such is then mixed by means of a receiver mixer 16 with the instantaneous high frequency signal $s_{HF}$, wherein the high frequency signal $s_{HF}$ produced by the signal production circuit 11 is borrowed for this using a signal divider 12. In this way, a measurement signal $s_{IF}$ typical for the FMCW method (also known as the intermediate frequency- or IF-signal) is generated. Its frequency $f_{peak}$ is, in the absence of disturbing influences, only dependent on the distance d and enables, thus, the measuring of fill level L. In contrast with the frequencies of the radar signal $S_{HF}$ and the response signal $R_{HF}$, the frequency $f_{peak}$ of the measurement signal $s_{IF}$ is, due to the difference forming between radar signal $S_{HF}$ and response signal $R_{HF}$ by the mixer 16, constant (as long as the fill level L does not change).

Instead of transmitting antenna 14 and receiving antenna 15 as separate units, use of a suitable transmitting/receiving separator, or directional coupler, would alternatively naturally also permit the implementing of a combined transmitting/receiving antenna. This could in the case of low frequencies up to about 26 GHz, analogously to the application of two separate antennas, be designed again as a horn antenna, or at higher frequencies as a planar antenna.

For ascertaining its frequency $f_{peak}$ (or, when the radar signal is, in given cases, also reflected on disturbing bodies, a plurality of frequencies $f_{peak}$), the measurement signal $s_{IF}$ is usually subjected to an analog-/digital conversion by a digitizing unit 17. Then, the digitized measurement signal $s_{IF}$ can be subjected to a (fast-) Fourier transformation and, thus, be converted into an easily evaluatable, frequency spectrum. Based on the maximum of the spectrum, the frequency $f_{peak}$ and, thus, the distance d, and the fill level L, can be determined. In the case of the example of an embodiment shown in FIG. 2, a corresponding evaluating unit 18 is provided for this. When the evaluating unit 18 is, for example, in the form of a microcontroller, FPGA or the like, the above mentioned digitizing unit 17 can be an integral function block of the evaluating unit 18.

Figure 3A:
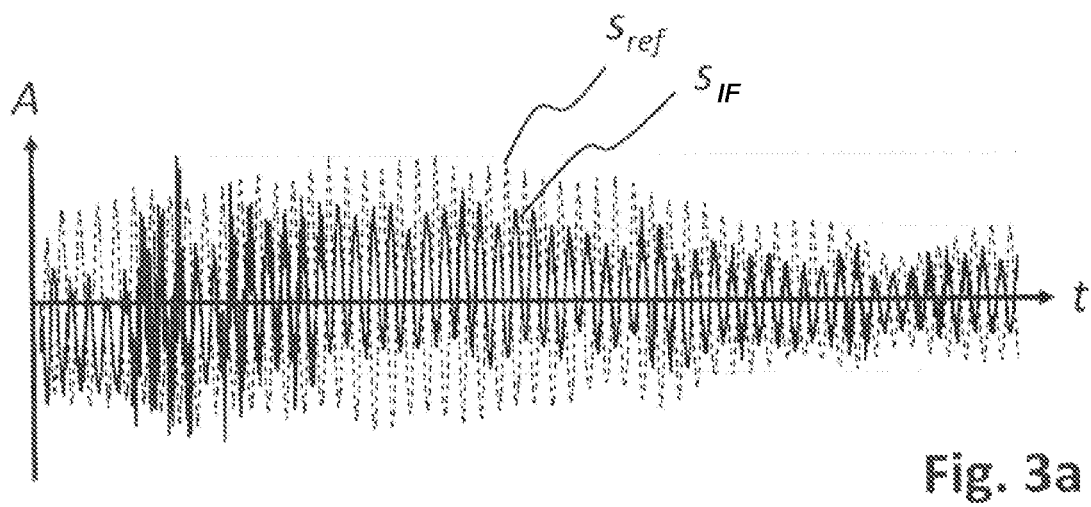
FIG. 3 shows schematic graphs for ascertaining the correlation coefficient.
Figure 3B:
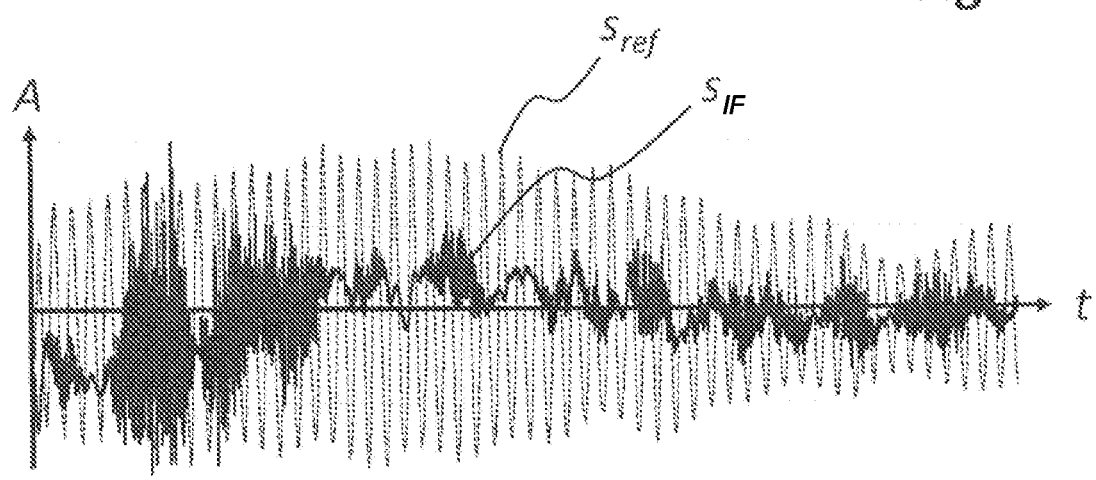

The measurement signal $s_{IF}$ is shown as a function of time in FIG. 3a and FIG. 3b before performance of the Fourier transformation by means of the digitizing unit 17. In such case, the measurement signal $s_{IF}$ shown in FIG. 3b is for a later fill level measurement as compared with the measurement signal $s_{IF}$ shown in FIG. 3a. From comparison of FIGS. 3a and 3b, it is evident that the signal-quality of the measurement signal $s_{IF}$, such as regards, for instance, the amplitude A or the frequency resolution, can decline with increasing number of measurements. Reasons for this can include, for example, a gradual accretion buildup on the transmitting antenna 14 and/or the receiving antenna 15 in the form of dust containing fill substance 3. Also, internal sources of failure of the fill level measuring device 1, for example, a detuning of the mixer 17, can lead to this behavior.

The quality decline between the measurement signal $s_{IF}$ measured in FIGS. 3a and 3b is, additionally, evident relative to a reference signal $s_{ref}$ shown in both figures. In such case, the reference signal $s_{ref}$ can be, for example, a stored measurement signal $s_{IF}$, which was recorded under defined reference conditions. The reference signal shown in FIGS. 3a/b was obtained at the start-up of the fill level measuring device 1, when the container interior was clean and empty, thus, the container 2 had, at most, fill substance 3 rising to the predefined minimum fill level $L_{min}$.

The invention is based on the observation that a change of the measurement signal $s_{IF}$ resulting from disturbing influences very directly affects the correlation coefficient K between the measurement signal $s_{IF}$ and the earlier stored reference signal $s_{ref}$. This can be seen based on FIG. 3c, in which the correlation coefficient K is shown as a function of increasing number N of fill level measurements. This shows that the correlation coefficient K weakens with increasing number N of fill level measurements when the signal-quality of the measurement signal $s_{IF}$ lessens due to increasing disturbing influences.

The presence of a faulty state of the fill level measuring device 1, or a defective fill level measurement, can, consequently, be detected by defining a minimum value $K_{min}$ of the correlation coefficient K. In such case, the minimum value $K_{min}$ represents a threshold value, below which a reliable fill level measurement is no longer possible, and, thus, a faulty state of the fill level measuring device 1 is present.

When the correlation coefficient K is ascertained by means of cross correlation, the calculation can occur based on the formula $$K = \sum_{i=1}^{n-\varphi} A_{IF,i} * A_{ref,i+\varphi}$$

In such case, $A_{IF,i}$ and $A_{ref,i}$ are the corresponding, equal phase and normalized amplitude values of the measurement signal $s_{IF}$ and of the reference signal $s_{ref}$ (compare FIGS. 3a and 3b). For correctly ascertaining the correlation coefficient K, there must be no phase shift $\varphi$ of the measurement signal $s_{IF}$ and the reference signal $s_{ref}$ relative to one another, this being shown especially in FIG. 3a. Otherwise this must, such as indicated in the formula, be correspondingly corrected for calculating the correlation coefficient.

As can be seen additionally from the above formula, the value of the correlation coefficient K depends decisively on the amplitudes A of the measurement signal $S_{IF}$ and the reference signal $s_{ref}$. Regarding the minimum value $K_{min}$, it is, consequently, not possible per se to define a fixed value, below which the fill level measuring device 1 is to be graded as no longer capable of functioning. As derivable from FIG. 3c, the minimum value $K_{min}$ can, however, be defined, for example, as a function of the correlation coefficient K reigning at the first measurement (N=1, for example, the measurement, in which the reference signal $s_{ref}$ was also ascertained), thus, for example, $k_{min} = \frac{1}{10} * K_{N=1}$. A sensible definition of the minimum values $K_{min}$ can, additionally, be determined, for example, also via corresponding aging tests with the fill level measuring device.

If during ongoing operation of the fill level measuring device 1, the minimum value $K_{min}$ of the correlation coefficient K is subceeded, then this is detected by a logic-gate 19 (see FIG. 2) of the fill level measuring device 1 designed for this. For this, the correlation coefficient K between the measurement signal $s_{IF}$ and the reference signal $s_{ref}$ is calculated in the logic-gate 19, for example, based on above described formula. For calculating the correlation coefficient K, the logic-gate 19 uses the measurement signal $s_{IF}$ from the mixer 16. The reference signal $s_{ref}$ is obtained, for example, from the evaluating unit 18 (see FIG. 2). In such case, the logic-gate 19 can also be designed as an integral part of the evaluating unit 18. A possible subceeding of the minimum value $K_{min}$, or a presence of a faulty state, can, in turn, be transmitted per a corresponding disturbance message to the superordinated unit 4.

Figure 3C:
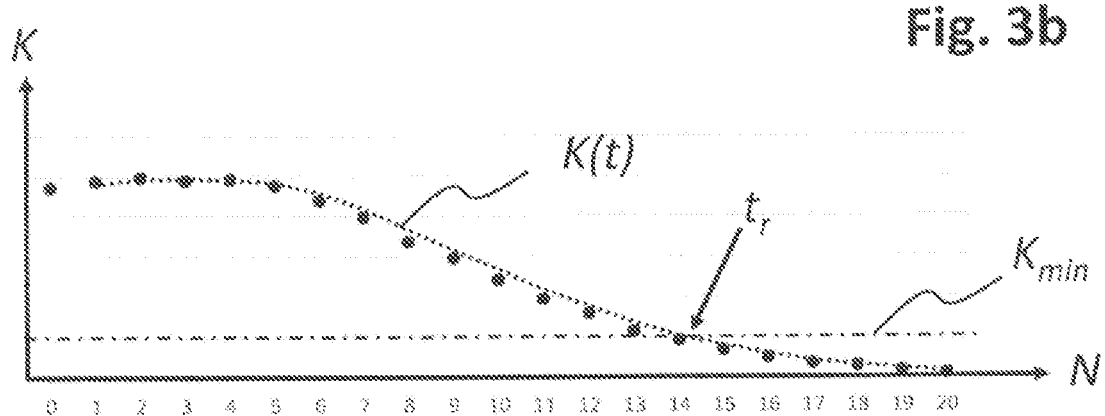

Shown in FIG. 3c, moreover, is another development of the method of the invention. The idea here is to approximate a remaining operating time $t_r$, based on the correlation coefficients K of at least two fill level measurements, until the minimum value $K_{min}$ of the correlation coefficient K is subceeded and, thus, a faulty state of the fill level measuring device 1 is reached. For this, a time development of the correlation coefficient K in the form of a corresponding mathematical function K(t) must be created based on the correlation coefficients K ascertained to the current point in time. Such a calculation makes sense naturally only when the correlation coefficient K at the point in time of the current fill level measurement has not yet subceeded the minimum value $K_{min}$. The creating of the time-dependent function K(t) of the correlation coefficient K and/or the calculating of the remaining operating time $t_r$, can, in turn, be done by the evaluating unit 18 (compare FIG. 2).

The time-dependent function K(t) shown in FIG. 3c is based on regression of the changing correlation coefficient K by means of the sliding average value. In general, the choice of a suitable regression type (thus, also exponential, logarithmic, etc.) in the sense of invention is, however, not limited to any special regression type, but, rather, depends on the particular behavior of the correlation coefficient K (for example, for finding a suitable regression type and/or for performing the actual regression, the method of least squares could be applied).

Following creating of the time-dependent function K(t) of the correlation coefficient K, this function is used, starting from the correlation coefficient K of the measurement signal $s_{IF}$ at the point in time of the last fill level measurement, to approximate the probable remaining operating time $t_r$, until the correlation coefficient K will subceed the minimum value $K_{min}$. By means of this further development of the invention, thus, a faulty state can be predicted according to the principle of "predictive maintenance".

The invention claimed is:

1. A method for detecting a faulty state of a frequency modulated continuous wave (FMCW)-based fill level measuring device serving for measuring a fill level of a fill substance located in a container, the method comprising:
   transmitting an FMCW radar signal;
   receiving a response signal;
   creating a measurement signal based at least on the response signal;
   correlating the measurement signal with a reference signal using a correlation function;
   calculating a correlation coefficient using the correlation of the measurement signal with the reference signal; and
   detecting the faulty state when the correlation coefficient subceeds a predefined minimum value.

2. The method as claimed in claim 1,
   wherein the correlation function is a cross correlation, and
   wherein the correlation coefficient, K, is calculated according to the formula:

$$K = \sum_{i=1}^{n-\varphi} A_{IF,i} * A_{ref,i+\varphi}$$

wherein $A_{IF,i}$ is an amplitude of the measurement signal, $A_{ref,i}$ is an amplitude of the reference signal, n is a number of measured values per measuring/reference signal, and $\varphi$ is a phase shift between the measurement signal and the reference signal.

3. The method as claimed in claim 1, wherein the reference signal is based on a theoretically derived, ideal echo curve.

4. The method as claimed in claim 1, wherein the reference signal is based on a reference measurement performed by the fill level measuring device in the presence of previously known, reference measurement conditions.

5. The method as claimed in claim 4, wherein the reference measurement conditions are for subceeding of a minimum fill level.

6. The method as claimed in claim 1, further comprising:
creating a time-dependent function of the correlation coefficient based on the correlation coefficient and a change of the correlation coefficient during ongoing fill level measurements; and
when the correlation coefficient has not subceeded the predefined minimum value, calculating a remaining operating time, until the minimum value is subceeded based on the time-dependent function of the correlation coefficient.

7. The method as claimed in claim 6, wherein the time-dependent function of the correlation coefficient is created by means of a regression.

8. The method as claimed in claim 7, wherein, for performing the regression and/or for ascertaining a suitable regression type, the method of least squares is applied.

9. A fill level measuring device, comprising:
a signal production circuit for producing a radar signal;
a transmitting antenna for transmitting the radar signal;
a receiving antenna for receiving a response signal;
a mixer for producing a measurement signal by mixing the radar signal with the response signal; and
an evaluating unit configured to:
ascertain a fill level based on the measurement signal;
correlate the measurement signal with a reference signal using a correlation function;
calculate a correlation coefficient using the correlation of the measurement signal with a reference signal; and
detect a faulty state when the correlation coefficient subceeds a predefined minimum value.

10. The fill level measuring device as claimed in claim 9, wherein the evaluating unit is further configured to ascertain the fill level by performing a Fourier transformation, including a fast Fourier transformation, of the measurement signal.

\* \* \* \* \*